US007959010B2

(12) United States Patent
Hawkins et al.

(10) Patent No.: US 7,959,010 B2
(45) Date of Patent: Jun. 14, 2011

(54) STANDPIPE WITH INTEGRATED REGULATOR VALVE

(75) Inventors: Charles W. Hawkins, Sparta, TN (US); Mark T. Wieczorek, Cookeville, TN (US)

(73) Assignee: Cummins Filtration IP, Inc., Minneapolis, MN (US)

( * ) Notice: Subject to any disclaimer, the term of this patent is extended or adjusted under 35 U.S.C. 154(b) by 181 days.

(21) Appl. No.: 12/048,849

(22) Filed: Mar. 14, 2008

(65) Prior Publication Data
US 2009/0230063 A1    Sep. 17, 2009

(51) Int. Cl.
B01D 27/00    (2006.01)
B01D 35/00    (2006.01)
B01D 35/14    (2006.01)
F02M 37/22    (2006.01)

(52) U.S. Cl. ............... 210/433.1; 210/436; 210/438; 210/440; 210/441; 210/472; 210/130; 210/232; 210/248

(58) Field of Classification Search .............. 210/436, 210/472, 433.1, 438, 440, 441, 458; 277/361
See application file for complete search history.

(56) References Cited

U.S. PATENT DOCUMENTS

| 4,738,776 | A |   | 4/1988 | Brown |       |
|-----------|---|---|--------|-------|-------|
| 5,770,054 | A | * | 6/1998 | Ardes | ...... 210/130 |
| 6,170,519 | B1|   | 1/2001 | Carroll et al. | |
| 6,374,853 | B1|   | 4/2002 | Callies | |
| 7,014,761 | B2|   | 3/2006 | Merritt et al. | |
| 7,159,611 | B2|   | 1/2007 | Larsen | |
| 2002/0108897 | A1 | * | 8/2002 | Pavlin et al. | ........ 210/248 |
| 2003/0127384 | A1 |   | 7/2003 | Kapur | |
| 2004/0232063 | A1 | * | 11/2004 | Cline et al. | ........ 210/433.1 |
| 2006/0053756 | A1 | * | 3/2006 | Hawkins et al. | ...... 55/310 |
| 2008/0164188 | A1 | * | 7/2008 | Jensen et al. | ........ 210/120 |

FOREIGN PATENT DOCUMENTS

DE  19519352 C2  *  8/1997
KR  10-2007-0084596 A   8/2007

OTHER PUBLICATIONS

Machine Translation of DE19519352C2.*
International Search Report of PCT/US2009/036955, dated Sep. 16, 2009.
Written Opinion of the International Searching Authority of PCT/US2009/036955, dated Sep. 16, 2009.

* cited by examiner

Primary Examiner — Duane Smith
Assistant Examiner — Paul J Durand
(74) Attorney, Agent, or Firm — Hamre, Schumann, Mueller & Larson, P.C.; J. Bruce Schelkopf

(57) ABSTRACT

An apparatus, system, and method for bypassing a fuel filter pressure regulation valve which includes a bypass window and bypass passage. The bypass passage window is positioned in the top of a standpipe of a filter. The filter includes a filter cartridge with top and bottom end plates. The top end plate of the filter cartridge has a hole to receive a standpipe. The top end plate also has a sealing gasket to seal the bypass passage window when the proper filter cartridge is in place. This arrangement exposes the regulator valve to the fuel and/or air at the top of the filter housing when the proper filter cartridge is in place. Pressure in the housing opens the valve, allowing air and/or fuel to be vented through the bypass passage and back to the fuel tank.

23 Claims, 14 Drawing Sheets

STANDPIPE WITH INTEGRATED REGULATOR VALVE

BACKGROUND OF THE INVENTION

1. Field of the Invention

This invention relates to filtering systems that automatically vent air, and more particularly to a method, system and apparatus for a bypass for filters that automatically vent air.

2. Description of the Related Art

Filtering systems are used in a wide range of applications, such as for filtering fluids like oil and fuel for engines. Fuel filters are used to filter particulate matter as well as other contaminants from fuel so as to increase engine life and performance.

Over time, during routine operation, air can be introduced into the system. Air can be detrimental to the performance of the engine and must be purged from the system to ensure optimum fuel pump and/or injector performance. A pressure regulation valve disposed in the top of a standpipe has been used to vent air from the system.

Filter elements or cartridges are typically housed within a housing, often in such a way as to cooperate with a center tube or standpipe, which can consist of one or more pieces. In order to ensure proper sealing during filtration, elastomeric sealing rings are often arranged between the standpipe and the end plates on the filter cartridge.

Filter media may be constructed of various types of material, e.g., paper, cardboard, felt, melt-spun, or other media, often a material which can be incinerated when the element is replaced to reduce waste. Depending on the application, some material utilized in filter media is inappropriate for certain filtering requirements. For example, filter media appropriate for filtering fuel may be inappropriate for filtering oil. Therefore, it would be an improvement in the art to provide a method, system and apparatus for ensuring the proper filter media is utilized for the specific application.

From the foregoing discussion, it should be apparent that a need exists for ensuring the proper filter cartridge is utilized for the appropriate application.

SUMMARY OF THE INVENTION

The present invention has been developed in response to the present state of the art, and in particular, in response to the problems and needs in the art that have not yet been fully solved by currently available pressure regulation bypass means. Accordingly, the present invention has been developed to provide an apparatus, system, and method for bypassing a pressure regulation means in a fuel filtration system when an improper filter cartridge is used. The present invention overcomes many or all shortcomings in the art.

In one aspect of the invention, a fluid filter apparatus includes a filter housing defining a cavity, a fluid bypass passage disposed within the housing, and a seal which is configured to seal the bypass when the proper filter cartridge is correctly installed in the housing.

In a further aspect of the invention, a fluid filter apparatus includes a clean fluid passage and a fluid bypass passage disposed within a standpipe, a clean fluid window in fluid communication with the clean fluid passage and a fluid bypass window in fluid communication with the fluid bypass passage.

In a further aspect of the invention, a fluid filter apparatus includes a filter element with a top and bottom end plate and a bypass window seal disposed within the filter element.

In a further aspect of the invention, a method of servicing a fuel filter apparatus includes providing a housing, a standpipe disposed axially in the housing, a bypass window disposed within the standpipe, a filter cartridge disposed in the housing, and a seal disposed in the filter cartridge, removing the filter cartridge, unsealing the bypass window, inserting a new filter and resealing the bypass window.

In a further aspect of the invention, a fuel filter system includes a housing defining a cavity, a standpipe extending within the cavity, a clean fluid passage disposed within the standpipe, a clean fluid window in communication with the clean fluid passage, a fluid bypass passage disposed within the standpipe, a fluid bypass window in communication with the fluid bypass passage, a filter cartridge comprising a filter element, a top end plate disposed on top of the filter element, a bottom end plate disposed on bottom of the filter element, a bypass window seal disposed in the filter cartridge, a standpipe cap disposed within the top end of the standpipe and a pressure regulation valve disposed within the standpipe cap.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Discussion of the features and advantages, and similar language, throughout this specification may, but do not necessarily, refer to the same embodiment.

The described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention. These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention will be rendered by reference to specific embodiments illustrated in the appended drawings, which depict only typical embodiments of the invention and are not to be considered limiting of its scope, in which.

DETAILED DESCRIPTION OF THE INVENTION

It will be readily understood that the components of the present invention, as generally described and illustrated in the figures herein, may be arranged and designed in a wide variety of different configurations. The following more detailed description of the embodiments of the apparatus, system, and method of the present invention is not intended to limit the scope of the invention as claimed, but is merely representative of selected embodiments of the invention.

Reference throughout this specification to "one embodiment," "an embodiment," or similar language means that a particular feature, structure, or characteristic described in connection with the embodiment is included in at least one embodiment of the present invention. Appearances of the phrases "in one embodiment," "in an embodiment," and similar language throughout this specification may, but do not necessarily, all refer to the same embodiment.

The described features, structures, or characteristics of the invention may be combined in any suitable manner in one or more embodiments. In the following description, numerous specific details are provided for a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
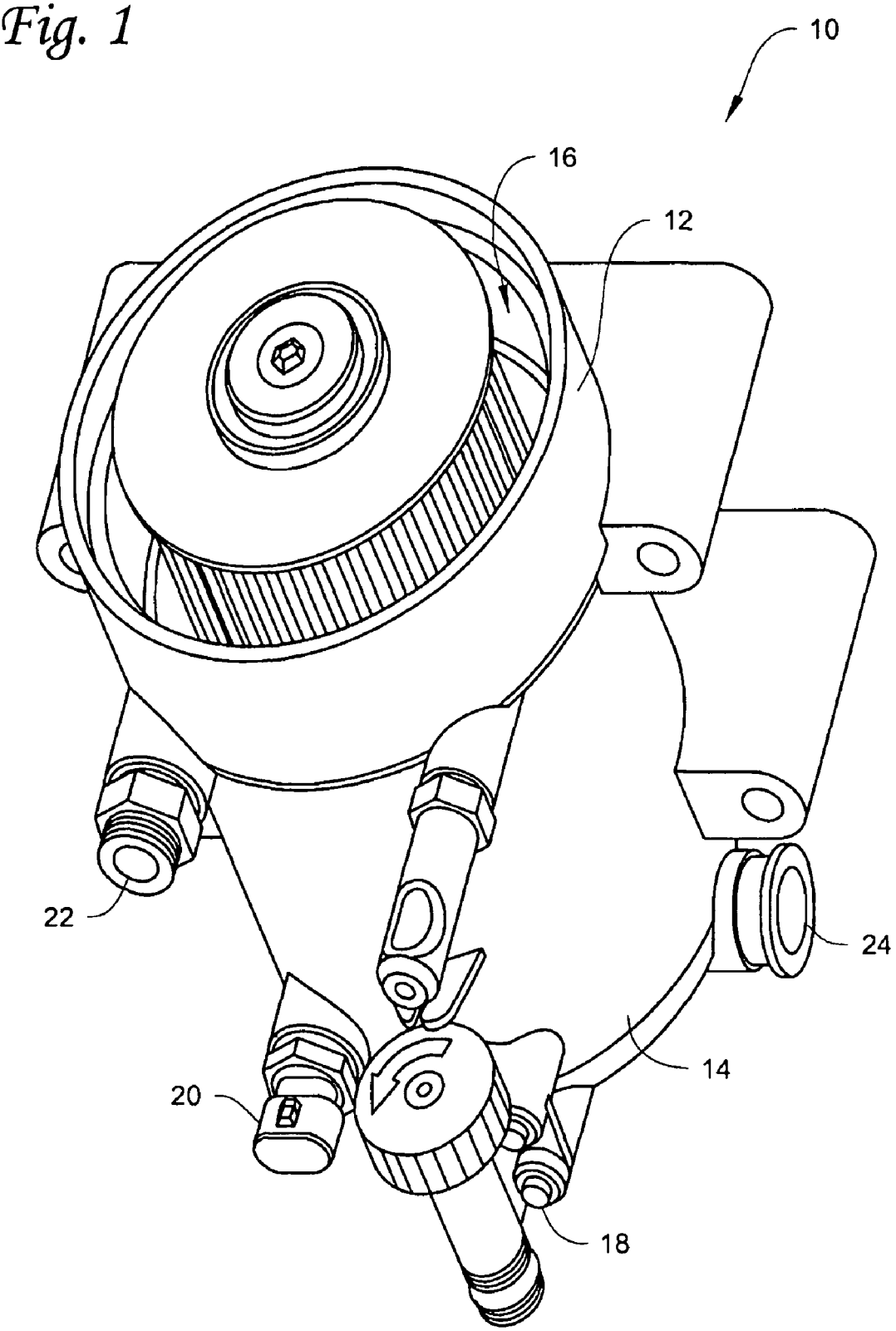
FIG. 1 is a perspective view of a filter system according to one embodiment of the present invention.
Figure 2:
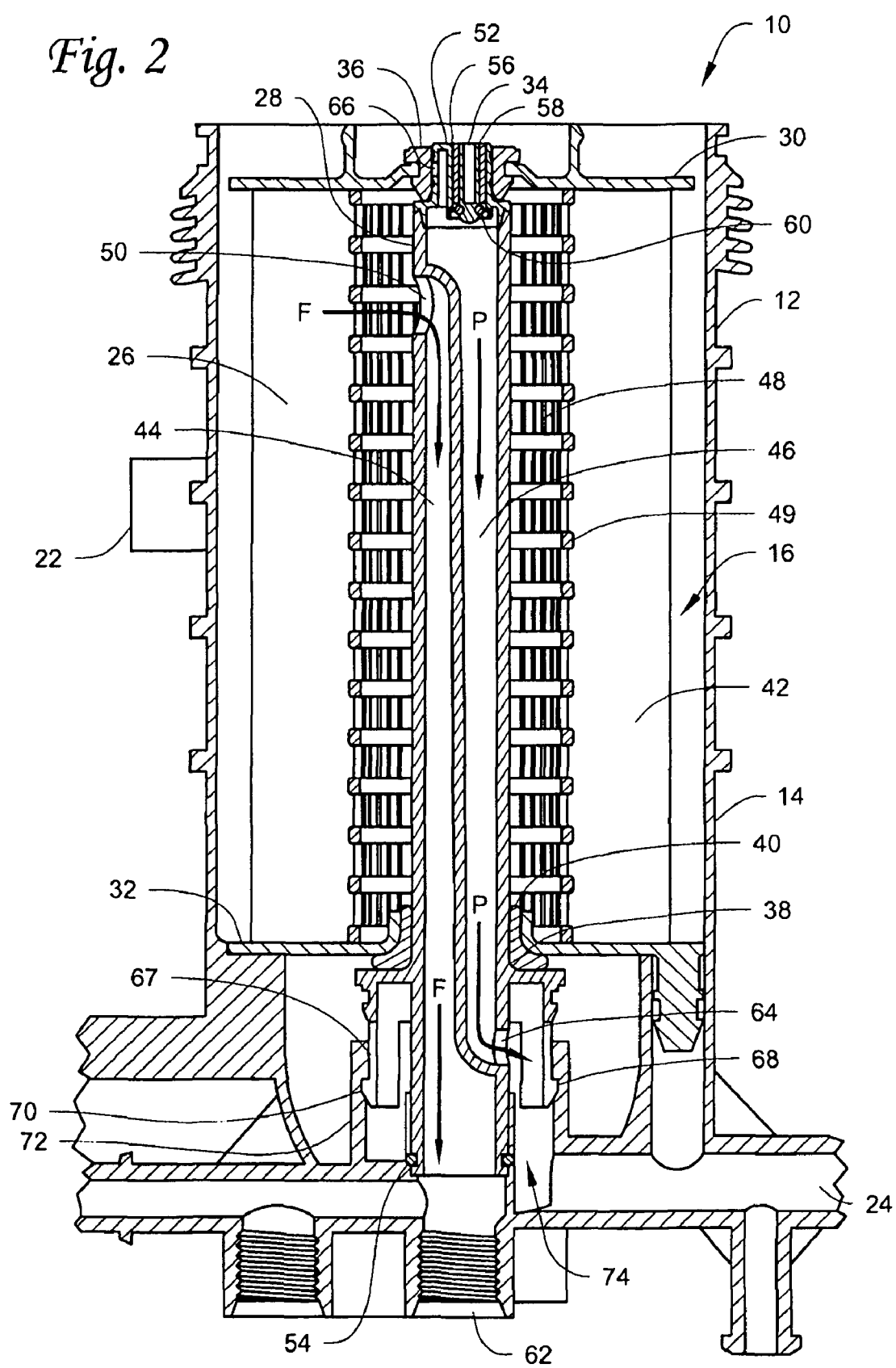
FIG. 2 is a cross sectional view of a filter used in the FIG. 1 system.

FIGS. 1 and 2 show a filter system 10 according to the invention including a fuel filter 12. Although the illustrated embodiment will be described with reference to a fuel filter system, it should be recognized that features from the system 10 can be adapted for use in other types of environments and for other kinds of fluids. The fuel filter 12 includes a filter housing 14 defining a filter cavity 16. Referring to FIG. 1, the filter 12 includes a fuel/water sensor 20 and water drain valve 18 from which water is drained from the filter cavity 16. The housing 14 further defines an inlet port 22 through which unfiltered fuel is supplied to the fuel filter 12 and a drain port 24 from where excess fuel and/or air are bled back into the fuel tank. Many fuel systems require that air be purged from the system for proper operation and pressure regulation is required for optimum pump and injector performance. Therefore, in one embodiment, the fuel filter 12 is located near the highest point in some fuel systems, and is thus the ideal location to purge air.

Inside the filter cavity 16, the fuel filter 12 includes a filter cartridge 26 for filtering the fuel that is received around a standpipe 28. The filter cartridge 26 has a filter media or element 42 for filtering fuel. The filter element 42 is sandwiched between a top end plate 30 and a bottom end plate 32. In certain embodiments, the filter element 42 defines a cylindrical filtered fluid cavity 48 which is supported by a plurality of ribs 49. The filter element 42 can include filter media of the type suitable for the particular fluid to be filtered. In the illustrated embodiment, the filter cartridge 26, as well as other components of the filter 12, are generally cylindrical in shape. One skilled in the art will recognize that the filter components may comprise shapes other than cylindrical in other embodiments.

The top end plate 30 defines a top standpipe opening 34 in which a top portion of the standpipe 28 is received. Around the top standpipe opening 34, the top end plate 30 has an upper standpipe seal 36. The upper standpipe seal 36 forms a seal between the standpipe 28 and the top end plate 30, thereby minimizing the risk of fuel bypassing the filter element 42. The bottom end plate 32 defines a lower standpipe opening 38 in which a bottom portion of the standpipe 28 is received. Around the lower standpipe opening 38, the bottom end plate 32 has a lower standpipe seal 40. The lower standpipe seal 40 forms a seal between the standpipe 28 and the bottom end plate 32, thereby minimizing the risk of fuel bypassing the filter element 42.

Figure 3:
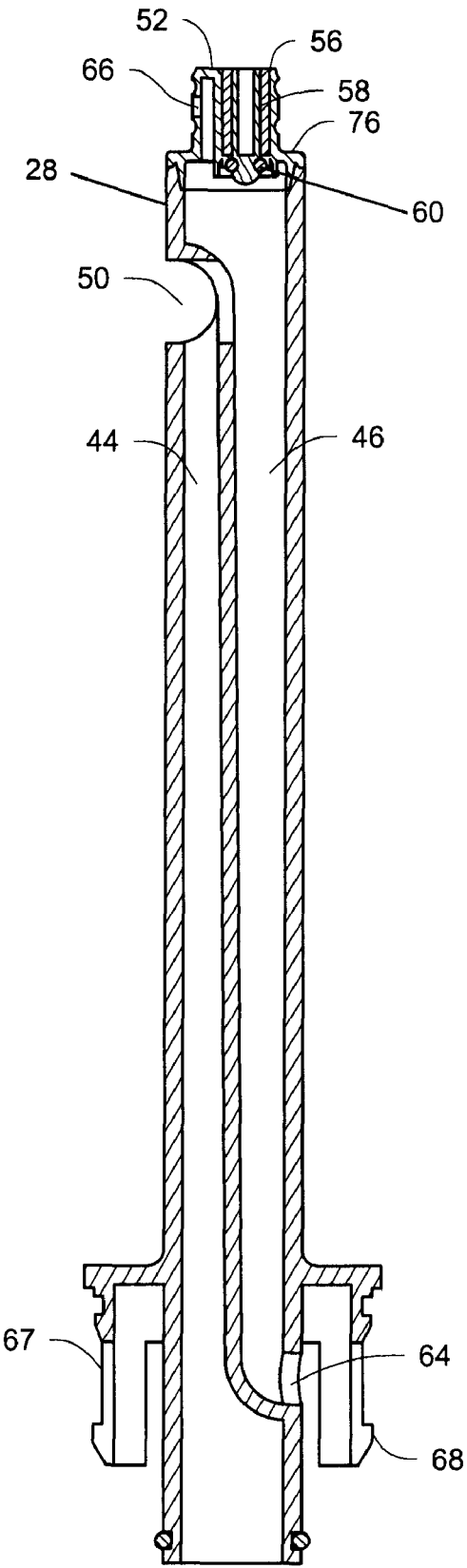
FIG. 3 is a cross sectional view of a standpipe according to one embodiment of the present invention.

FIG. 2 illustrates one embodiment of the current invention in which the standpipe 28 comprises a top end 52 and a bottom end 54. A clean fluid passage 44 and a bypass fluid passage 46 are disposed within the standpipe 28. The clean fluid passage 44 is in fluid communication with the filtered fluid cavity 48 through the clean fluid window 50. The clean fluid window 50 is located proximal the top of the standpipe 28. The bottom portion of the clean fluid passage 44 is located proximal the bottom end 54 of the standpipe 28. The clean fluid passage 44 is in fluid communication with a destination port 62 proximal the bottom end of the standpipe 28. The bypass fluid passage 46 is in fluid communication with the drain port 24 through the drain port window 64. The drain port window 64 is proximal the bottom end 54 of the standpipe 28. A bypass window 66 is disposed proximal the top end of the standpipe and in certain embodiments, the bypass window 66 is located in a standpipe cap 76 as illustrated in FIG. 3. When the filter cartridge 26 is placed within the filter cavity 16, the upper standpipe seal 36 encompasses the bypass window 66 and provides a fluid tight seal. When the cartridge 26 is removed or an improper filter cartridge is utilized, the bypass window 66 will not be sealed and fluid may freely flow through the bypass window 66 and into the bypass fluid passage 46.

When a user inserts an incorrect filter cartridge 26, or the filter cartridge 26 is improperly installed within filter cavity 16, the upper standpipe seal 36 will not plug the bypass window 66. Where the bypass window 66 is not sealed, fluid freely flows through the bypass window 66 and into the bypass fluid passage 46. In certain embodiments the bypass fluid passage 46 is in communication with the fluid source such that when the bypass fluid window 66 is not sealed, fluid is shunted back to its source. Where the fluid is shunted back to the fluid source, the fluid system 10 may be prevented from reaching the required pressure for operation. In certain embodiments, where the fluid system 10 fails to reach the required pressure for operation, the system 10 may notify the operator that an incorrect filter cartridge was installed or that the filter cartridge 26 was improperly installed within the filter cavity 26. In certain embodiments, the system 10 may notify the operator of the incorrect filter cartridge 26 or the improper installation of the filter cartridge 26 by means of a fault light configured to illuminate when the fluid system 10 fails to reach the required pressure for operation. In the case of a fuel filter, the engine may simply not start where the system 10 fails to reach the required pressure for operation. In certain embodiments the engine manufacturer may provide a means for illuminating a fault light as well as a means for disabling the engine where the system 10 fails to reach the required pressure for operation. One skilled in the art will recognize that the fault indicator and engine disabling may also be the result of the failure to insert a filter cartridge 26 into filter cavity 16. Thus, severe damage to the fluid system 10 may be avoided with the current invention.

In certain embodiments, such as the embodiment shown in FIG. 3, a standpipe cap 76 may be affixed to the top end 52 of the standpipe 28. The standpipe cap 76 contains a pressure regulator valve 58 and a bypass window 66. The standpipe cap 76 may be constructed of molded plastic and be press fitted into the standpipe as shown. However, it should be understood that the cap may be connected in other ways and may be constructed of other material. In certain embodiments, the standpipe cap 76 may contain no bypass window 66 but may still contain a pressure regulator valve 58. Although in the illustrated embodiment the valve 58 is positioned in the standpipe cap 76, it is envisioned that the valve 58 in other embodiments can be recessed in the standpipe 28. One skilled in the art will recognize that where the valve 58 is recessed in the standpipe 28, the standpipe cap 58 may be eliminated without departing from the spirit of the current invention. Similarly, the cap 76 may be integrally molded onto the standpipe 28 such that the cap 76 and standpipe are one continuous part.

A regulator valve passage 56 is disposed in the standpipe cap 76. A pressure regulation valve 58 is disposed within the regulator valve passage 56. The pressure regulation valve 58 regulates pressure in the system 10. Although the illustrated embodiment will be described with reference to a pressure regulation valve, it should be understood that other types of valves can be used, such as check valves, bypass valves, and thermostatic valves, to name a few examples. The pressure regulation valve 58 has a predetermined cracking pressure at which the valve opens in order to relieve pressure. When opened, the valve 58 also allows air trapped at the top of the filter 12 to be vented back into the fuel tank. The pressure regulation valve 58 is secured inside the regulator valve passage 56, and a seal 60 is disposed between the pressure regulation valve 58 and the regulator valve passage 56 so as to minimize the chance of fluid and/or air leaking around the valve 58. In other embodiments, the seal 60 is eliminated because any resulting fuel leakage would return the fluid back to the fluid reservoir and any air leakage might actually improve the air venting performance.

Once the desired cracking pressure is reached, the valve 58 opens, thereby relieving pressure and venting any air trapped in the top of the filter 12. Fluid and air flowing through the valve 58 flows into the bypass passage 46. Fluid and air then flow through the bypass passage 46 through the drain port window 64 and into the drain port 24.

Referring again to FIG. 2, at the base of the housing 14 the filter has a housing adapter 72 that couples the standpipe 28 to the housing 14. The standpipe 28 has a corresponding standpipe adapter 67 which is received within the housing adapter 72 on the housing 14. Alternatively, the standpipe adapter 67 may be larger than the housing adapter 72 in which case the housing adapter 72 may be received within the standpipe adapter 67. In the embodiment illustrated in FIG. 2 and FIG. 3, the standpipe adapter 67 has a retention flange 68 that is received in a corresponding groove 70 on the housing adapter 72. However, one skilled in the art will recognize that the standpipe adapter 67 and the housing adapter 72 can be secured in other ways. The housing adapter 72 along with standpipe adapter 67, define a flow cavity 74 where the purged fluid and/or air flows to the drain port 24. As stated above, the clean fluid passage 44 is in fluid communication with the destination port 62 proximal the bottom end 54 of the standpipe 28.

Figure 4:
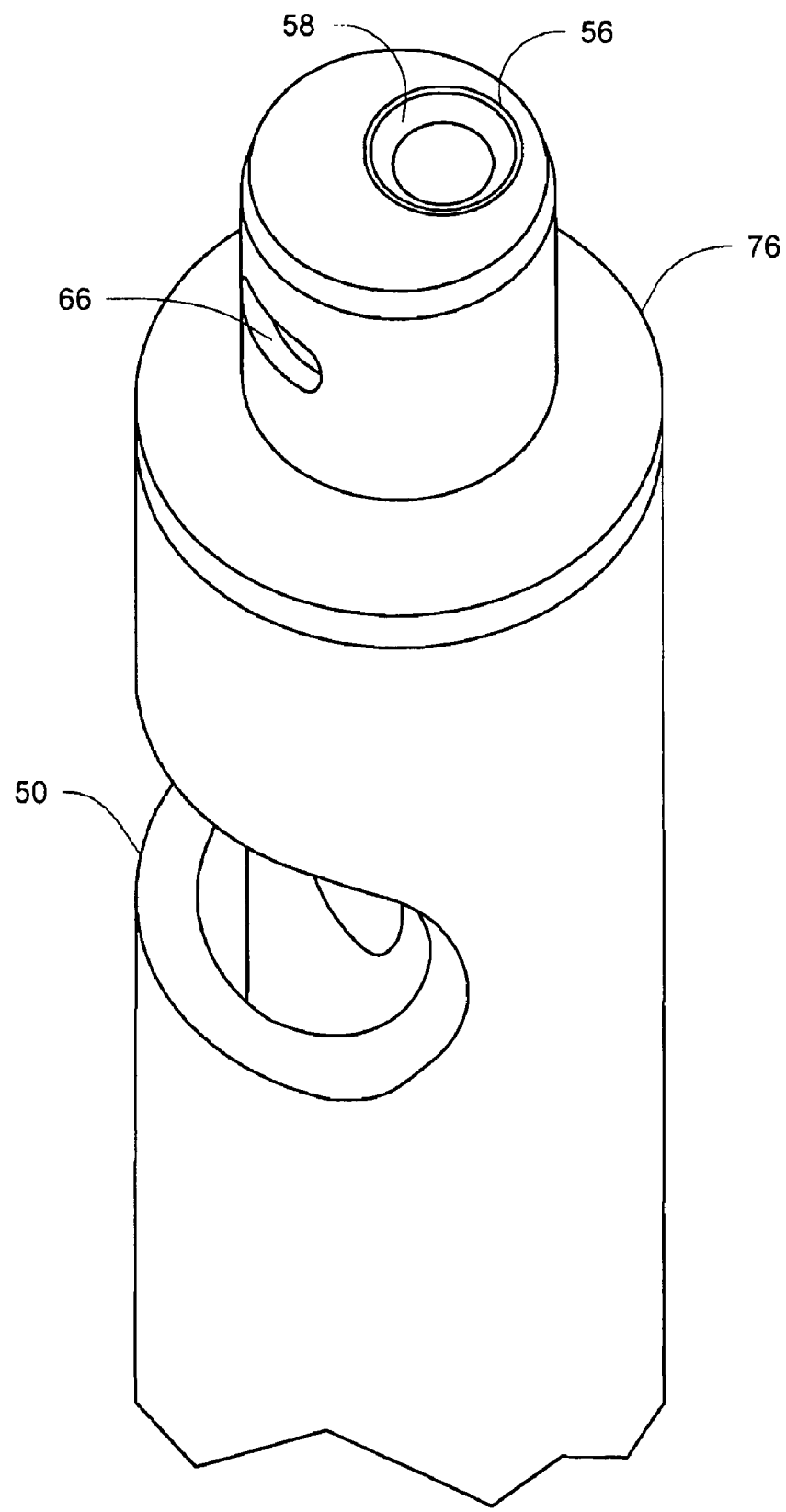
FIG. 4 is a perspective view of a standpipe including a standpipe cap with a bypass window according to one embodiment of the present invention.
Figure 5:
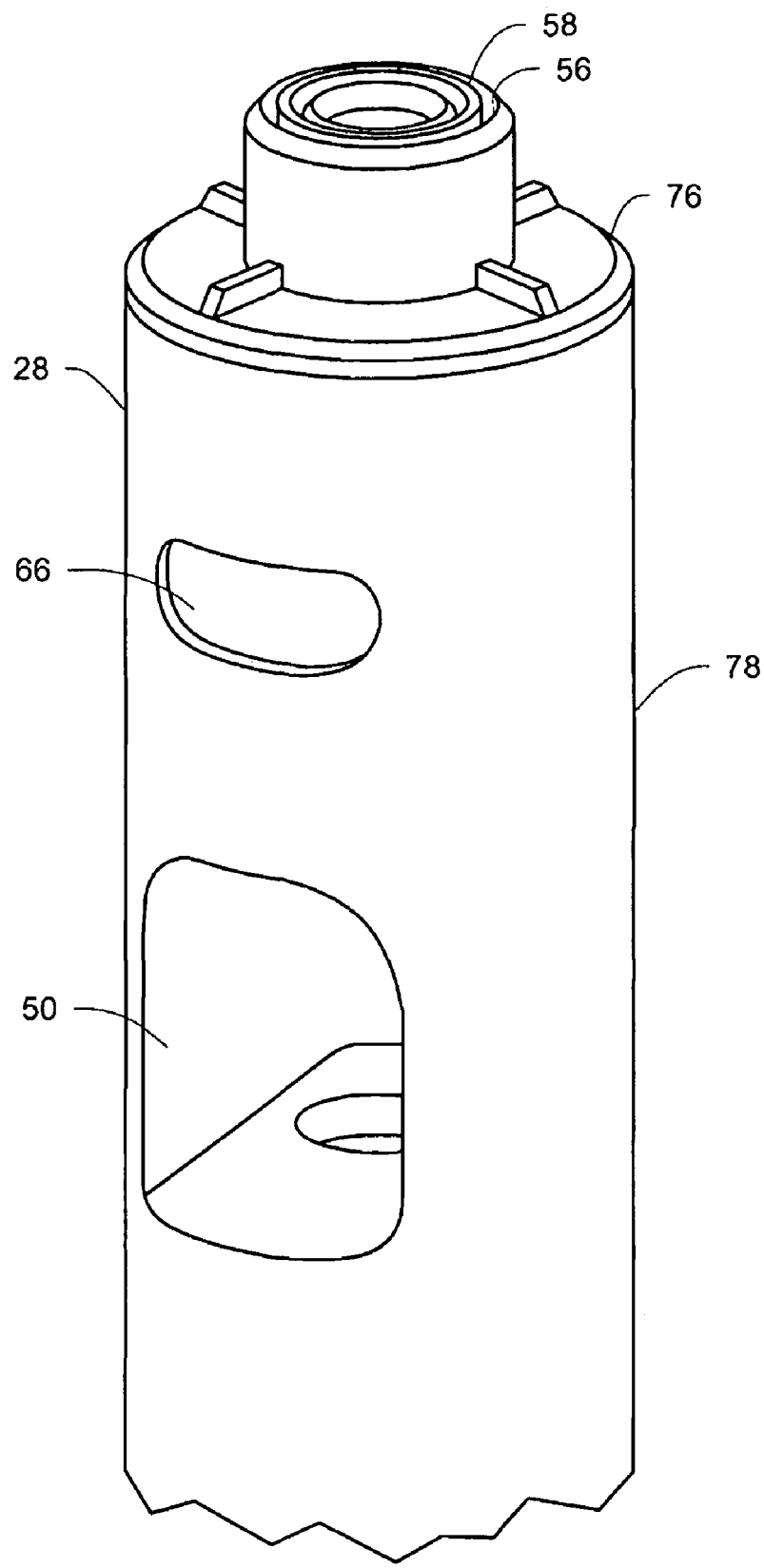
FIG. 5 is a perspective view of standpipe including a standpipe cap with a bypass window according to an alternate embodiment of the present invention.

The bypass window may be located in the standpipe cap 76 as shown in FIG. 4. In an alternative embodiment of the present invention shown in FIG. 5, the fluid bypass window 66 may be located in the standpipe wall 78 of the standpipe 28. As will be discussed in more detail below, when the bypass window 66 is disposed in the standpipe wall 78 of the standpipe 28 numerous different sealing arrangements are possible.

Figure 6:
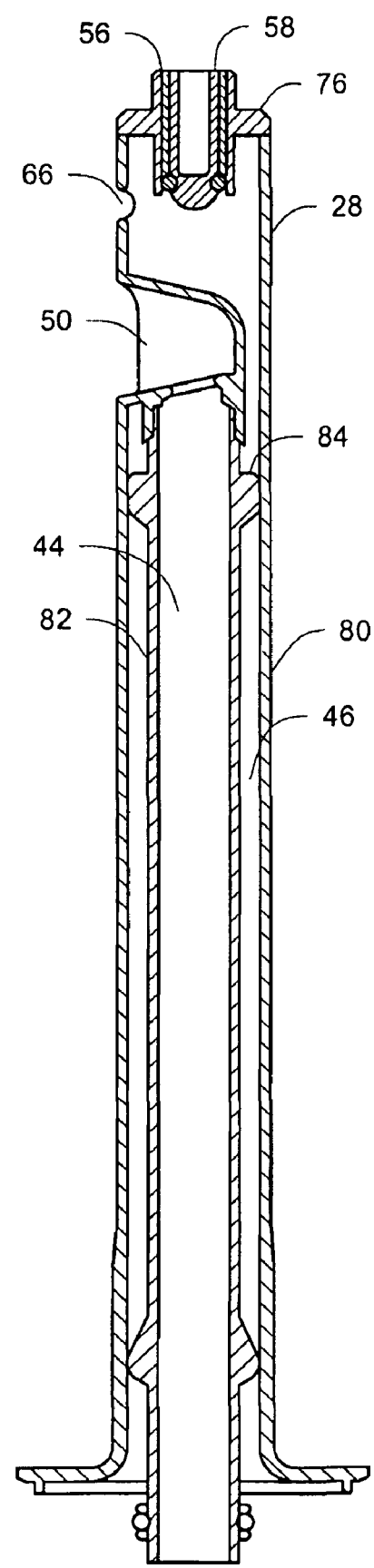
FIG. 6 is a cross sectional view of a standpipe according to one embodiment of the present invention.

Turning now to FIG. 6, an alternative embodiment of the standpipe 28 is shown. In this embodiment, the standpipe comprises two tubes nested within each other. The outer tube 80 creates the bypass fluid passage 46. Unfiltered fluid and/or air may enter the bypass fluid passage 46 through the regulator valve 58. Alternatively, unfiltered fluid and/or air may enter the bypass fluid passage through the bypass fluid window 66 when the filter cartridge 26 is not in place or when an incorrect filter cartridge is placed within the filter cavity 16. The inner tube 82 creates the clean fluid passage 44 and is in fluid communication with filtered fluid through the clean fluid passage window 50. The inner tube 82 and outer tube 80 may be concentric with the inner tube 82 further comprising stand off fins 84 to position the inner tube 82 in the center of the outer tube 80.

Figure 7:
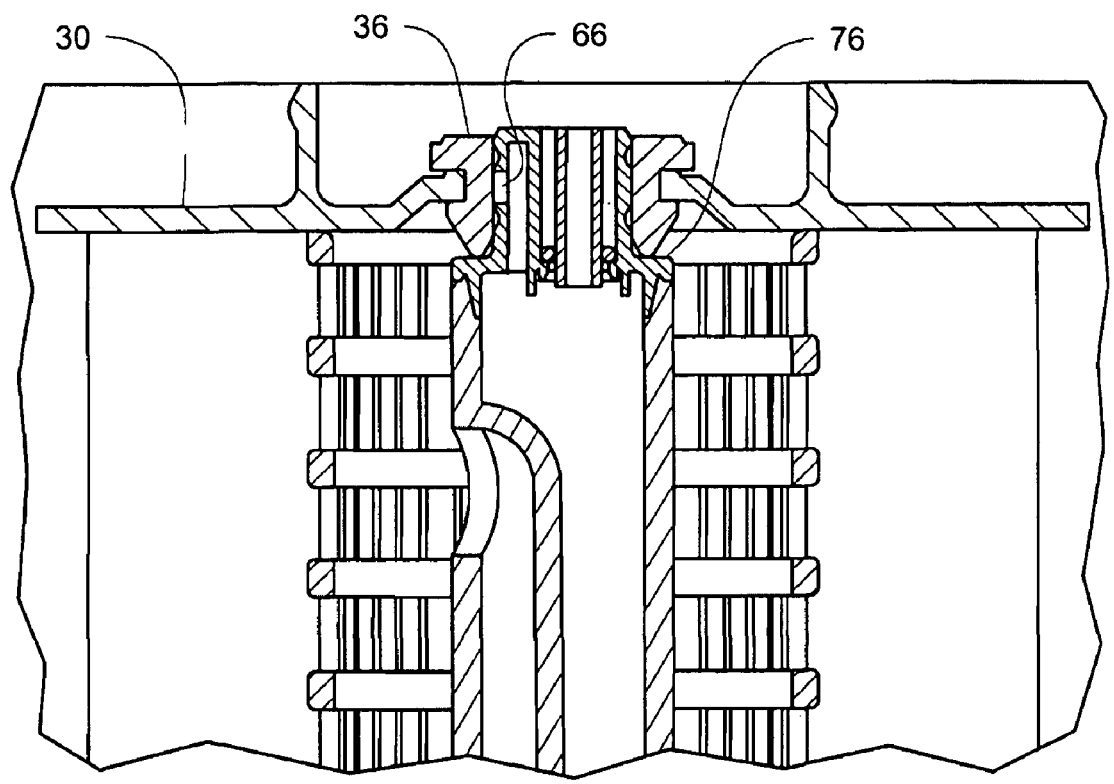
FIG. 7 is a cross sectional view of a standpipe including a standpipe cap with a bypass window and a filter cartridge according to one embodiment of the present invention.

As is shown in FIG. 7, where the bypass window 66 is located in the cap 76, the seal 36 disposed on the top end plate 30 acts to seal the bypass window. While a single seal is shown in FIG. 7, it is understood that multiple seals may be used. It is further understood that other seal configurations may be used without departing from the spirit of the current invention.

Figure 8:
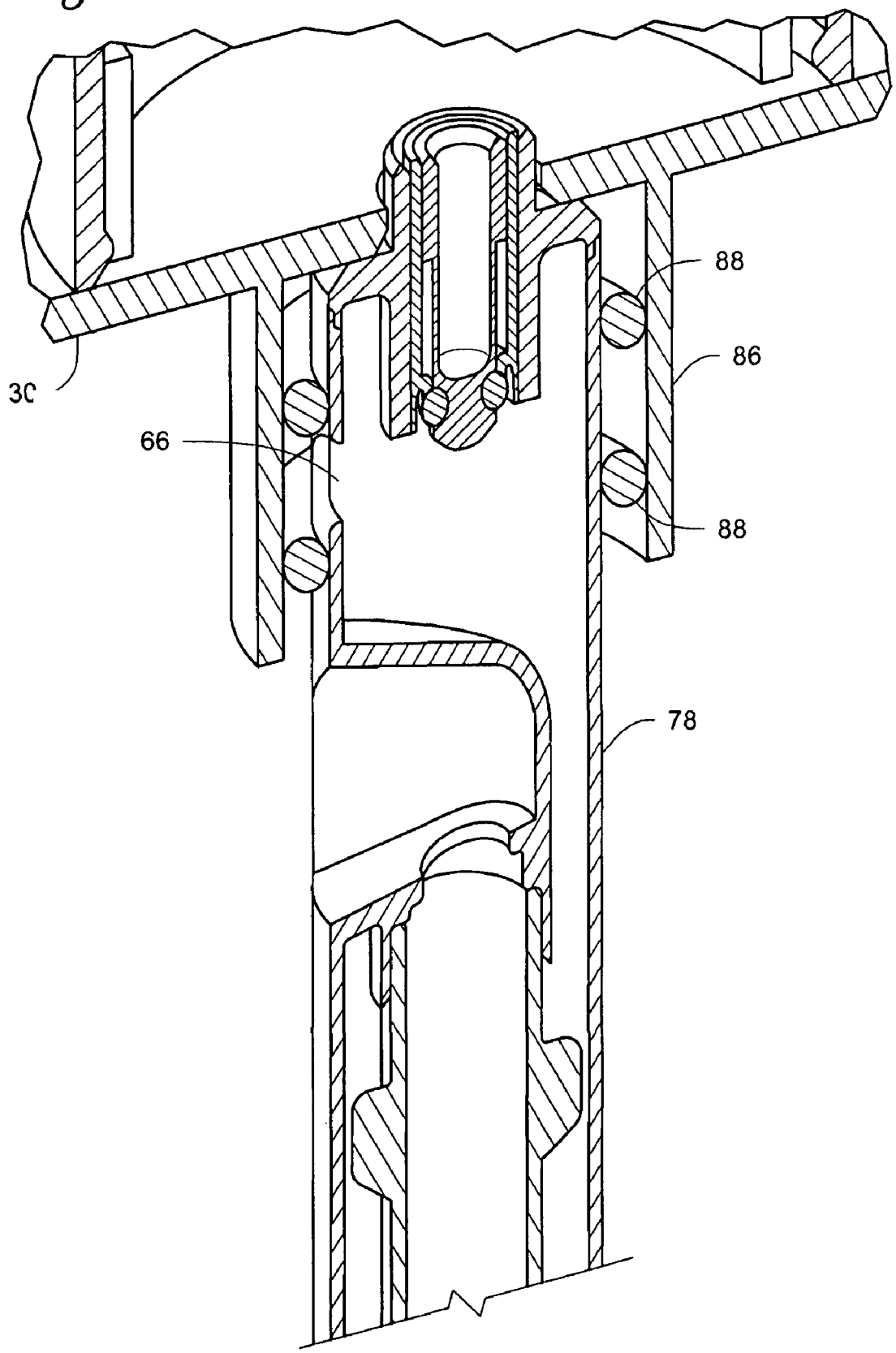
FIG. 8 is a cross sectional view of a standpipe, filter cartridge and seals according to one embodiment of the present invention.
Figure 9:
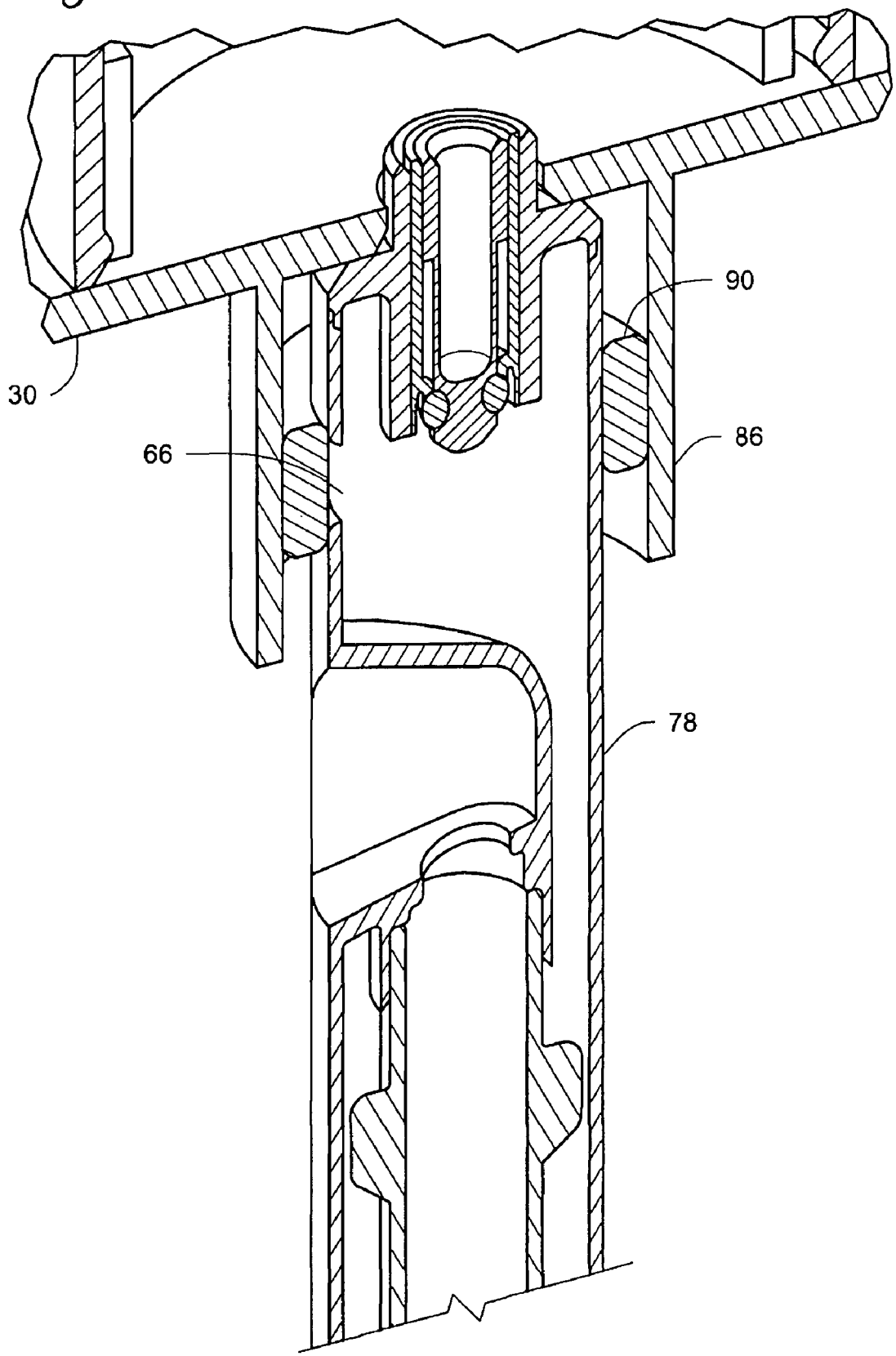
FIG. 9 is cross sectional view of a standpipe, filter cartridge and seals according to an alternate embodiment of the present invention.
Figure 10:
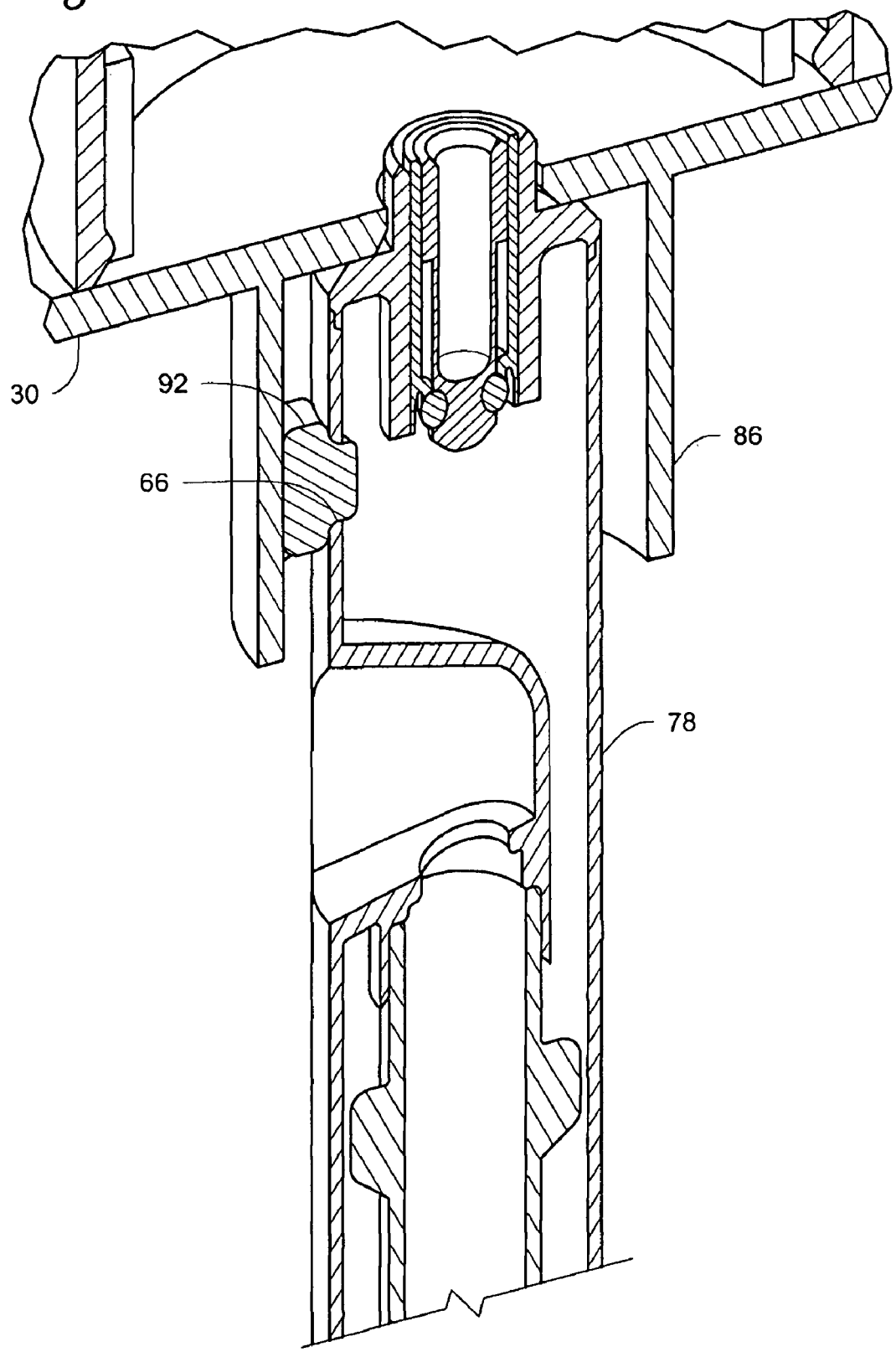
FIG. 10 is cross sectional view of a standpipe, filter cartridge and seals according to an alternate embodiment of the present invention.
Figure 11:
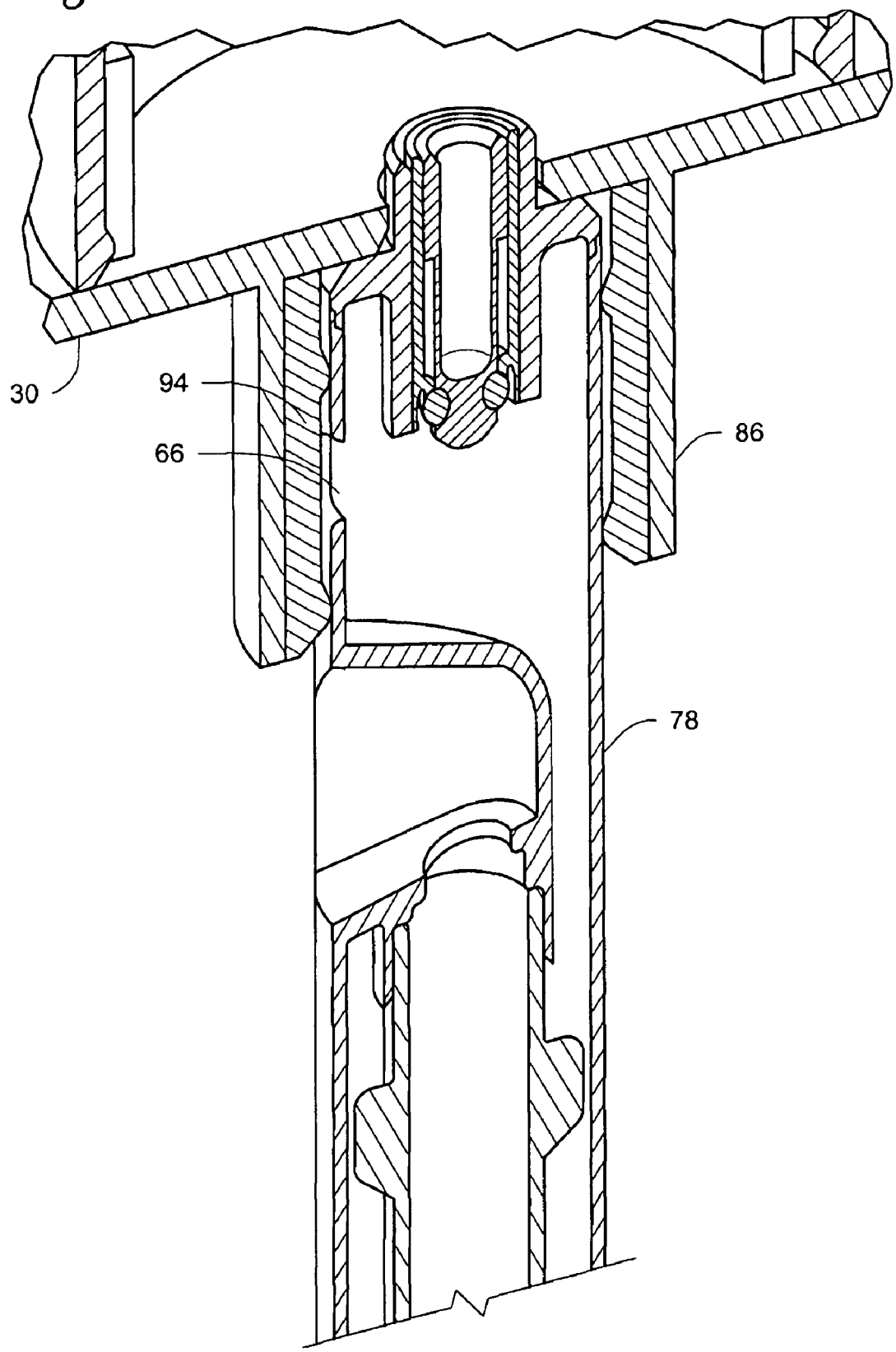
FIG. 11 is cross sectional view of a standpipe, filter cartridge and seals according to an alternate embodiment of the present invention.

FIG. 8 through FIG. 11 illustrate alternative embodiments of the current invention wherein the bypass window 66 is located in the standpipe wall 78. Where the bypass window 66 is disposed in the standpipe wall 78, the top end plate 30 may have a seal retention flange 86 to receive one or more seals. When the proper filter cartridge is utilized, the bypass window 66 is sealed and fluid cannot flow through the bypass window 66 and into the bypass passage 46. In FIG. 8 the seals 88 comprise a double grommet which surrounds and isolates the bypass window 66. FIG. 9 illustrates a cylindrical sleeve seal which covers and seals the bypass window 66. In FIG. 10 a plug 92 is inserted and nests within the bypass window 66. In FIG. 11 the seal 94 comprises a gasket with two raised portions which surround and isolate the bypass window 66.

Figure 12:
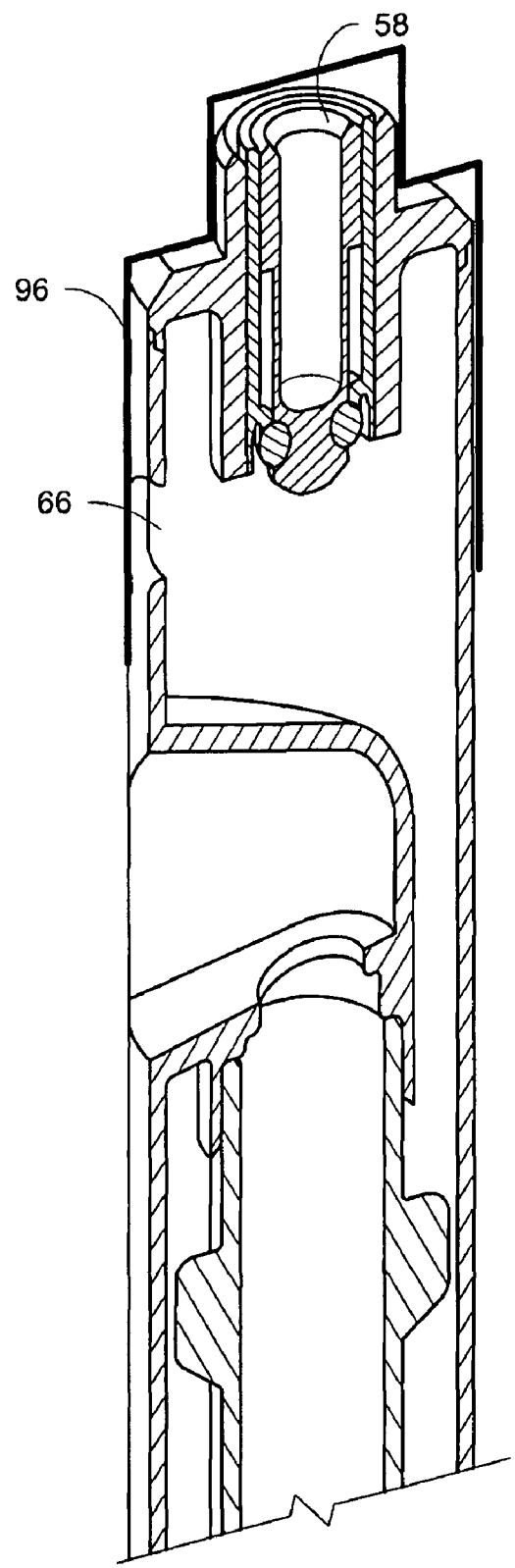
FIG. 12 is a cross sectional view of a standpipe and a cap according to one embodiment of the present invention.
Figure 13:
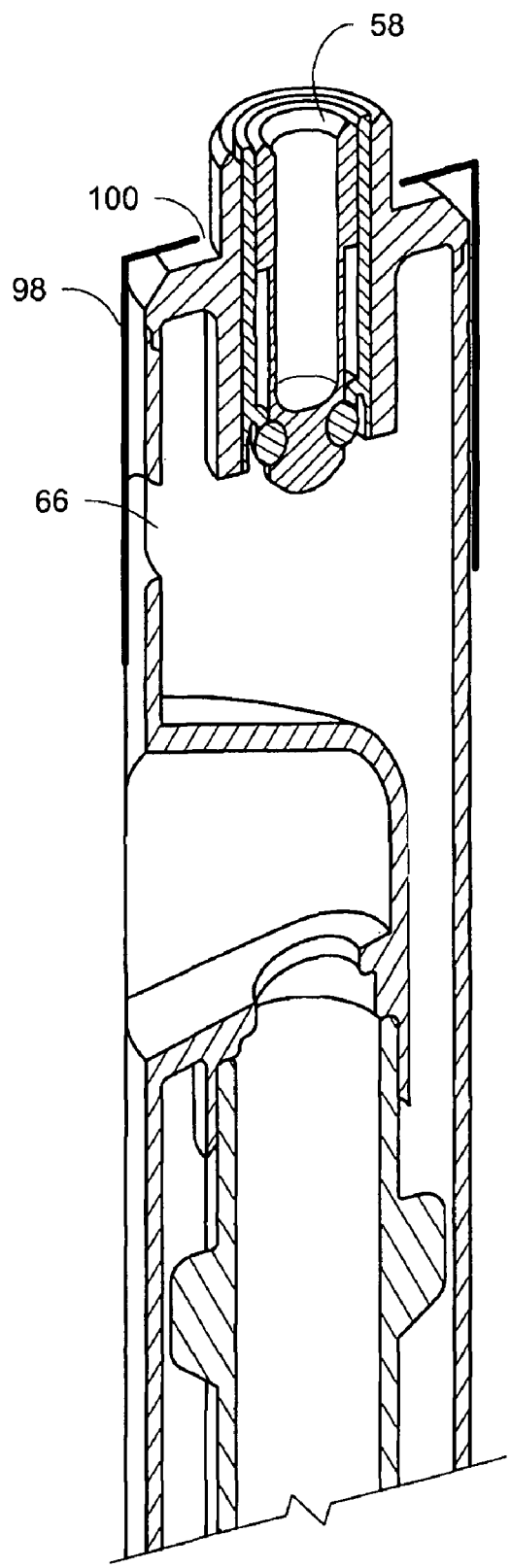
FIG. 13 is a cross sectional view of a standpipe and a cap according to an alternate embodiment of the present invention.

In another embodiment, shown in FIG. 12, the bypass window 66 may be plugged by a cover 96 that fits over the end of the standpipe and plugs both the bypass window 66 and the regulator valve 58. Another embodiment is shown in FIG. 13 which includes a cover 98 that fits over the end of the standpipe which plugs the bypass window 66 wherein the cover 98 further comprises a hole 100 in the top for receiving the regulator valve 58 through the top so that the regulation function is not hampered. The embodiments illustrated in FIG. 12 and FIG. 13 show the bypass window 66 disposed in the side of the standpipe wall 78. In certain embodiments, such as the embodiments illustrated in FIG. 3 through FIG. 7, the bypass window 66 is disposed in the standpipe cap 76. One skilled in the art will recognize that the standpipe cap 76 and the standpipe 28 may comprise a single unitary material rather than two separate components. In use, the cover 96 of FIG. 12A may be utilized by a mechanic, when servicing the engine, to diagnose problems in the fluid system 10 without the necessity of installing a filter cartridge 26. In the embodiments illustrated in FIG. 12, the cover 96 allows the mechanic to seal both the bypass window 66 and the regulator valve 58 without installing the filter cartridge 26. In the embodiments illustrated in FIG. 13, the cover 98 may plug only the bypass window 66, leaving the regulator valve 58 uncovered such that its function is not hampered. In certain embodiments, not shown, the cover may be configured to cover the regulator valve 58, the bypass window 66, and the clean fluid window 50. In yet another embodiment, also not shown, the cover may be configured to cover the bypass window 66 and the clean fluid window 50, but may leave the regulator valve 58 uncovered.

In certain embodiments, the cover 96 or cover 98 may be positioned on the top of the standpipe 28 as illustrated in FIG. 12 and FIG. 13 before positioning the filter cartridge 26 on the standpipe 28. By placing the cover 98 on the end of the standpipe 28, the bypass window 66 may be rendered inoperable if desired while still utilizing the filter cartridge 26. Similarly, in certain embodiments, it may be desirable to render the regulation valve 58 inoperable by placing a cover such as the cover 96 of FIG. 12 on the end of the standpipe 28 before installing the filter cartridge 26 thereon. One skilled in the art will recognize that the bypass window 66 and regulation valve 58 may be plugged by other means before installing the filter cartridge 26 on the end of the standpipe 28. In certain embodiments the cover 96 or cover 98 may be connected to the top endplate 30. In an embodiment, the top endplate 30 may be molded such that the top endplate 30 comprises the cover 96 or cover 98.

Figure 14:
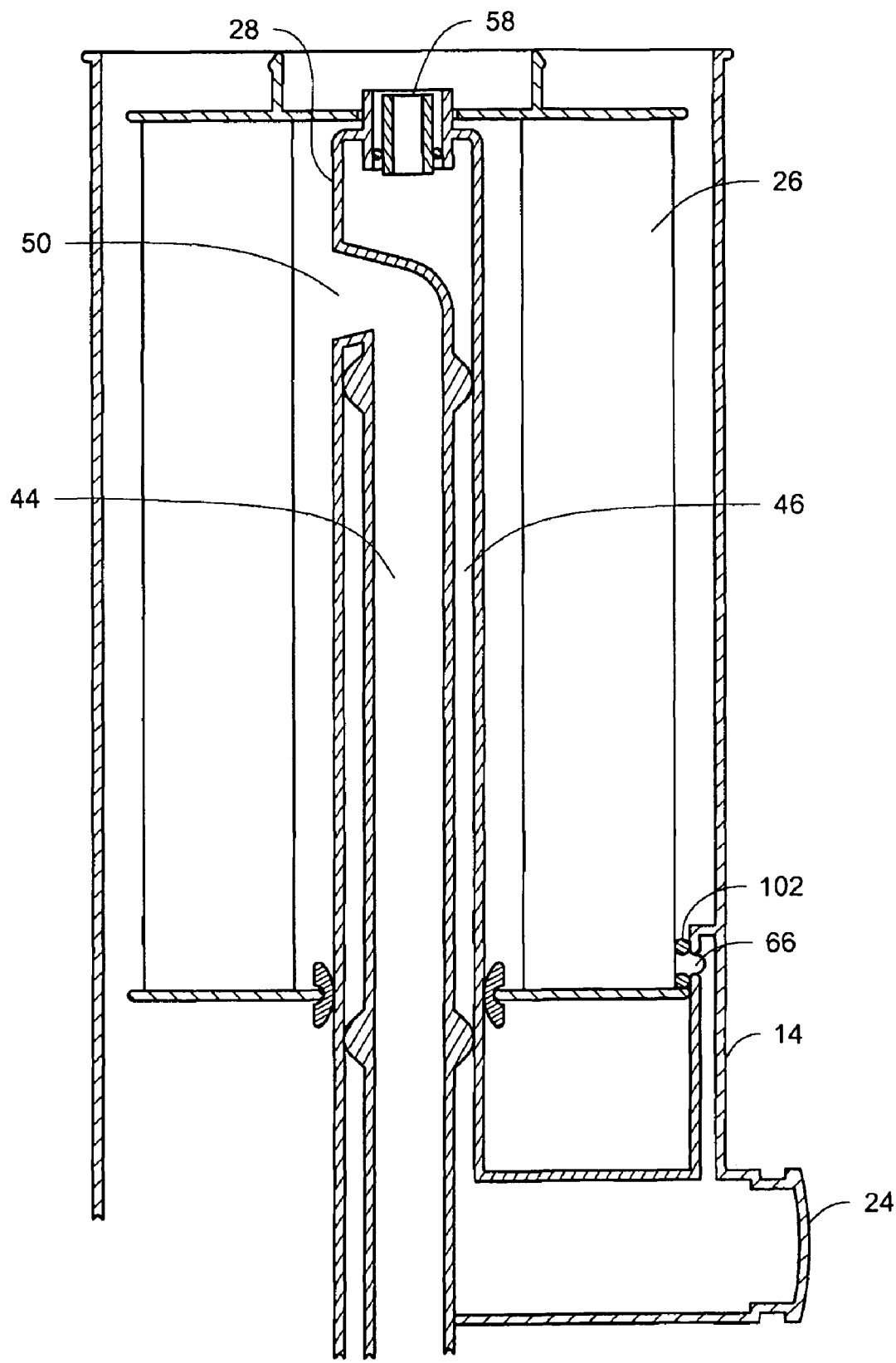
FIG. 14 is a cross sectional view of a filter system according to an alternative embodiment of the present invention.

An alternative embodiment of the present invention is shown in FIG. 14. In this embodiment a standpipe 28 is disposed in a filter housing 14. The standpipe comprises a bypass fluid passage 46 and a clean fluid passage 44. The clean fluid flows into the clean fluid passage 44 through a clean fluid window 50. A regulator valve 58 is disposed in the top of the standpipe 28. The regulator valve 58 provides passage of fluid and/or air into the bypass passage 46 upon the realization of certain conditions such as buildup of pressure. A filter cartridge 26 is disposed around the standpipe 28 which filters fluids. A bypass window 66 is disposed in the filter housing 14. The filter cartridge 26 seals the bypass window 66 by means of seals 102. While the illustrated embodiment shows the use of a double grommet seal, it is understood that other seal structures may be used. The bypass window 66 is in fluid communication with the drain port 24. Thus, when the filter cartridge 26 is removed or a filter cartridge is inserted into the housing 14 which does not contain the proper seal configuration, the fluid will flow through the bypass window 66 and into the drain port 24.

Returning to FIG. 2, during operation the unfiltered fuel flows into the filter cavity 16 via the fuel inlet port 22. From the filter cavity 16, the fuel is filtered by the filter cartridge 26 and flows into the filtered fluid cavity 48. From the filtered fluid cavity the fuel flows through the clean fluid window 50 in the direction of the F arrow. The fuel is then discharged through the destination port 62. When pressure builds in the filter system 10, a portion of fuel and/or air may flow through the regulation valve 58. When this happens the unfiltered fuel and/or air flows through the bypass passage 46 in the direction of the P arrow. The fuel in this instance flows through the drain port window 64 into the flow cavity 74 and finally through the drain port back to the fuel container. When the filter cartridge 26 is removed or an improper filter cartridge is inserted, the bypass window 66 is not sealed. When the bypass window 66 is not sealed, the pressure regulator valve 58 is bypassed and fuel may flow directly into the bypass passage. Thus there is no pressure regulation function when filter cartridge 26 is removed or an improper filter cartridge is inserted.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A fluid filter apparatus, comprising:
a housing defining a cavity; and
a standpipe located within the housing;
a bypass located within the standpipe;
a clean fluid passage located within the standpipe;
a bypass window in fluid communication with the bypass;
the bypass and the clean fluid passage are separated from each other; and
the bypass window is configured to be sealed by a filter cartridge; and
a regulator valve disposed in an opening of the standpipe that is separate from the bypass window.

2. The apparatus of claim 1, further comprising a seal sealing the bypass window.

3. The apparatus of claim 2, further comprising a filter cartridge housing the seal.

4. The apparatus of claim 1, wherein the valve is disposed within the standpipe in a standpipe cap, and the bypass window is also disposed in the standpipe cap.

5. The apparatus of claim 1, wherein the bypass window is located on a side wall of the standpipe or a side wall of a standpipe cap.

6. A filter apparatus comprising:
a standpipe having a top and a bottom, the standpipe having:
a clean fluid passage;
a clean fluid window in fluid communication with the clean fluid passage;
a fluid bypass passage;
a fluid bypass window in fluid communication with the fluid bypass passage; and
a valve disposed in an opening of the standpipe that is separate from the fluid bypass window, the valve and the fluid bypass window configured such that the valve provides pressure regulation when the fluid bypass window is sealed.

7. The apparatus of claim 6, wherein the clean fluid passage and the fluid bypass passage are concentric.

8. The apparatus of claim 6, wherein the clean fluid passage is parallel the fluid bypass passage.

9. The apparatus of claim 6, wherein the fluid bypass window is proximal the top of the standpipe.

10. The apparatus of claim 6, wherein the valve is disposed within the standpipe in a standpipe cap, and the fluid bypass window is also disposed in the standpipe cap.

11. The apparatus of claim 6, further comprising a fluid bypass window seal disposed in a filter cartridge.

12. The apparatus of claim 11, wherein the seal is configured to seal the fluid bypass window when the filter cartridge is installed on the standpipe.

13. The apparatus of claim 6, further comprising a cover configured to cover the fluid bypass window.

14. A fluid filter apparatus, comprising:
- a standpipe having a top and a bottom, the standpipe having
  - a clean fluid passage,
    - a clean fluid window in fluid communication with the clean fluid passage,
  - a fluid bypass passage,
    - a fluid bypass window in fluid communication with the fluid bypass passage, and
  - a valve disposed in an opening of the standpipe that is separate from the fluid bypass window, the valve and the fluid bypass window configured such that the valve provides pressure regulation when the fluid bypass window is sealed;
- a filter element having a top and a bottom,
  - a top end plate disposed on the top of the filter element, and
  - a bottom end plate disposed on the bottom of the filter element; and
- a bypass window seal on one of the filter element or standpipe that is configured to seal the fluid bypass window so as to indicate correct installation of the filter element on the standpipe, and allow the fluid filter apparatus to reach a required pressure for operation.

15. The apparatus of claim 14, wherein the bypass window seal is disposed on the standpipe.

16. The apparatus of claim 14, wherein the bypass window seal is located on the top end plate.

17. The apparatus of claim 16, wherein the bypass window seal comprises a double grommet.

18. The apparatus of claim 16, wherein the bypass window seal comprises a cylindrical sleeve.

19. The apparatus of claim 16, wherein the bypass window seal comprises a plug that nests with and seals the bypass window.

20. The apparatus of claim 16, wherein the bypass window seal comprises a gasket comprising a plurality of raised portions that isolate and seal a bypass window.

21. A fuel filter system comprising:
- a housing defining a cavity;
- a standpipe extending within the cavity, the standpipe comprising
  - a top and a bottom end,
  - a clean fluid passage disposed within the standpipe,
  - a clean fluid window in communication with the clean fluid passage,
  - a fluid bypass passage disposed within the standpipe, and
  - a fluid bypass window in communication with the fluid bypass passage;
- a filter cartridge comprising
  - a filter element having a top and a bottom],
  - a top end plate disposed on the top of the filter element, and
  - a bottom end plate disposed on the bottom of the filter element;
- a bypass window seal configured to seal the fluid bypass window; and
- a pressure regulation valve disposed within an opening of the standpipe that is separate from the fluid bypass window.

22. The apparatus of claim 21, wherein the pressure regulation valve is disposed within the standpipe in a standpipe cap, and the fluid bypass window is also disposed in the standpipe cap.

23. The apparatus of claim 21, wherein the fluid bypass window is located on a side wall of the standpipe or a side wall of a standpipe cap.

* * * * *